July 25, 1961 C. E. MILLER 2,993,405
METHOD FOR DETERMINING SPEED AND COURSE OF AN AIRPLANE
Filed June 18, 1958
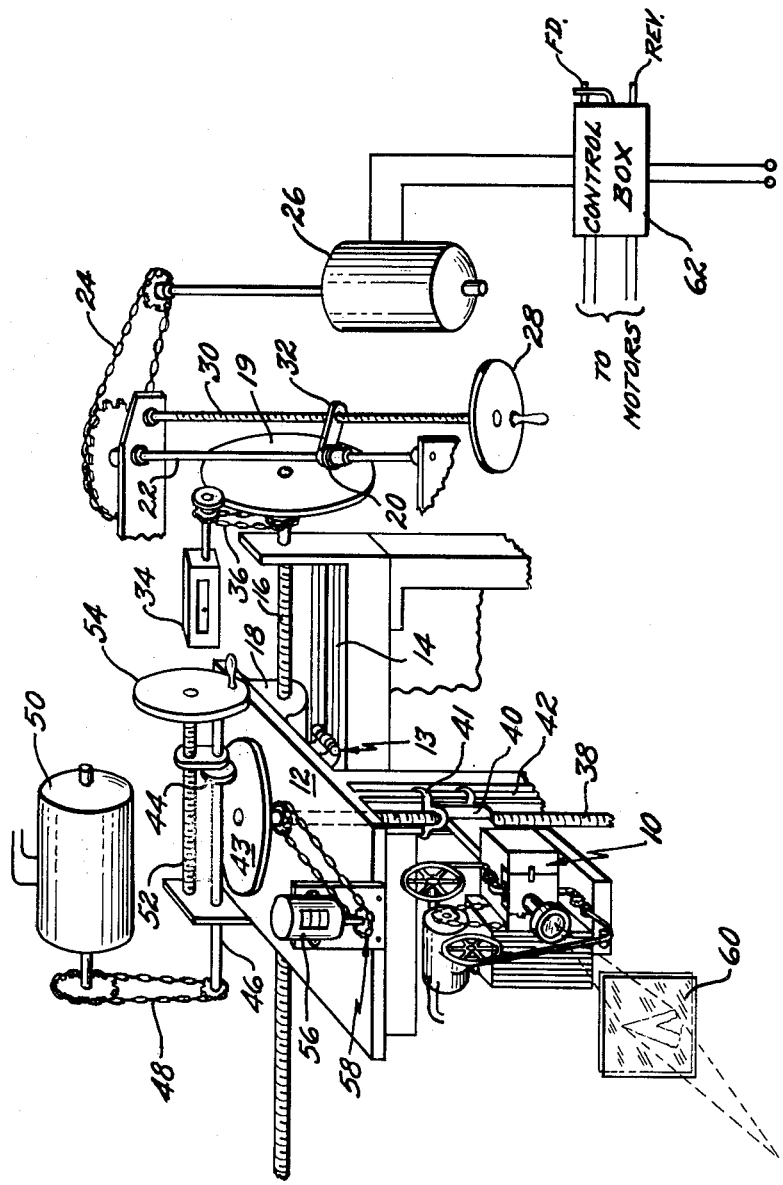
INVENTOR.
CLAIR E. MILLER
BY
ATTORNEYS

United States Patent Office 2,993,405
Patented July 25, 1961

2,993,405
METHOD FOR DETERMINING SPEED AND COURSE OF AN AIRPLANE

Clair E. Miller, San Rafael, Calif., assignor, by mesne assignments, to the United States of America as represented by the Secretary of the Air Force
Filed June 18, 1958, Ser. No. 742,970
2 Claims. (Cl. 88—14)

This invention relates to a method of rapidly computing the speed and flight course of an airplane from motion picture film taken from a plane when flying at a constant altitude and velocity. It will also be useful in making strip-maps of the flight.

Present methods and techniques require from one man-day to one man-week to plot the course of a plane from motion pictures taken in flight, either conventional aerial photographs of the terrain or pictures of the radar images as shown by a "plan-position-indicator" (PPI) radar set as it is flown over the course to be plotted. In military intelligence work the present method is too slow. It is desirable from a military viewpoint to complete a course analysis in as short a time as possible.

It is an object of this invention to provide a method for quickly determining the ground speed and flight course of an airplane from motion pictures taken from the plane in flight.

It is a further object to provide a method for quickly preparing a strip-map of the course flown.

The essential elements of the invention consist of a standard motion picture projector fixed to a carriage which is moved both horizontally and vertically by synchronous motors through adjustable speed reducers. A screen is fixed parallel to a plane which contains the vertical and horizontal movements of the projector carriage and the picture focused on the screen. The motors are started and the horizontal and vertical speed reducers adjusted until the image on the screen appears to stand still. The speed of the plane can then be determined by the speed at which the projector is moving. If a film is run which is a succession of pictures of the radar images of a plan-position-indicator, a strip-map may be prepared by placing over the screen a large sheet of photographic paper, re-running the film and then developing the paper. The spot in the center of the radar screen will then trace a line across the paper which will be the flight course.

The appended drawing illustrates a preferred embodiment of the invention wherein a standard motion picture projector 10 is shown slidably attached to a carriage 12 by guides 41 moving on ways or tracks 42 and focused on a screen 60. The carriage is supported by rollers 13 on a frame 14 and is movable in a horizontal direction along the bed of the frame by a threaded rod 16 which engages a threaded bushing 18 attached to the said carriage 12. A plate 19 is attached to the rod 16 and is turned by a friction roller 20 which is keyed to, and slidable along, shaft 22. The shaft 22 is driven through a chain and sprocket drive 24 by synchronous motor 26. Roller 20 is in frictional contact with plate 19 and slidable along shaft 22 by threaded rod 30 as it is turned in threaded bushing 32. Handwheel 28 turns threaded rod 30 and moves the roller 20 toward or away from the center of plate 19, thus varying the angular velocity of the plate 19 and threaded rod 16 and, consequently, the movement of the carriage 12.

The rotation of the threaded rod 16 is communicated to an indicator 34 through a chain and sprocket drive 36. Vertical movement of the projector 10 is accomplished by a rod 38 which is threaded through a bushing 40 formed as part of guides 41 which are slidably mounted on ways or tracks 42 forming part of carriage 12. The rod 38 is fastened to plate 43 which is turned by a friction roller 44. The roller 44 is keyed to, and slidable along a shaft 46 which is driven through chain and sprocket drive 48 by a synchronous motor 50. The position of the friction roller 44 on plate 43 is determined by a threaded rod 52 which is rotated by handwheel 54. The velocity of the threaded rod 38 is communicated to indicator 56 by a chain and sprocket drive 58. This indicator may be calibrated in terms of ground speed. The motors are started, stopped or reversed by appropriate switches in a suitable control box 62.

When the rate of movement of the projector relative to the screen is such that the image on the screen appears to be stationary the speed of the plane from which the picture was taken may be quickly determined for a given altitude. As a matter of fact and as illustrated, the indicator 56 may be calibrated in terms of ground speed. Thus, the distance of any ground object projected on the screen from a given starting point may be immediately determined.

Usually, the vertical movement of the projector alone, as above described, is used to determine the velocity of the plane in which the camera was carried. Horizontal movement of the projector is usually arranged to compensate for drift of the plane or variation in course. Thus, when the position of the projected image is stationary, drift or change in course as well as plane speed can be determined.

A course analysis can be obtained and a strip-map prepared in a matter of minutes by this means and method after receipt of the finished film. It is merely necessary for the operator to load the film into the projector, start the motors and adjust the horizontal and vertical speed controls until the picture on the screen appears to stand still. The ground speed of the plane can then be read from the calibrated register and the course plotted. If a strip-map is required, it is merely necessary to place a sheet of photographic paper over the screen and run the film taken from images on the screen of a plan-position-indicator through the projector after the speed controls have been adjusted. The paper is then developed in the regular way and a photograph results which is a strip-map of the flight course. This strip-map may then be copied, enlarged or reduced by any photographic process.

What I claim is:

1. A method for preparing a strip-map of the flight course of an airplane from motion pictures taken of the images on a radar screen having a fixed reference point flown at a constant altitude and velocity which includes the steps of projecting said motion pictures on photosensitive paper, moving the projector horizontally and vertically and adjusting the horizontal and vertical movements of said projector to cause the projected picture to appear stationary on the said paper and developing the said paper to record the movement of said reference point.

2. A method for determining the speed of an airplane comprising the steps of taking motion pictures of the terrain from the said airplane flying at a constant speed and altitude, projecting said pictures on a stationary screen, moving the projector horizontally and vertically and adjusting said movements until said projected pictures appear stationary on said screen and recording the speed of the movement of said projector to determine the speed of said plane.

References Cited in the file of this patent

UNITED STATES PATENTS

| 2,822,720 | Douglas | Feb. 11, 1958 |

FOREIGN PATENTS

| 730,912 | Great Britain | June 1, 1955 |
| 1,011,309 | France | Apr. 2, 1952 |